(12) United States Patent
Chang

(10) Patent No.: US 10,434,588 B1
(45) Date of Patent: Oct. 8, 2019

(54) MECHANISM FOR THE RELATIVE POSITIONING OF AN INCLINED MEMBER AND A GRADUATED MEMBER

(71) Applicant: Chin-Chin Chang, Taichung (TW)

(72) Inventor: Chin-Chin Chang, Taichung (TW)

( * ) Notice: Subject to any disclaimer, the term of this patent is extended or adjusted under 35 U.S.C. 154(b) by 0 days.

(21) Appl. No.: 15/934,016

(22) Filed: Mar. 23, 2018

(51) Int. Cl.
| | |
|---|---|
| *B23D 45/04* | (2006.01) |
| *B27B 5/20* | (2006.01) |
| *B27B 5/29* | (2006.01) |
| *B23D 47/04* | (2006.01) |
| *B23D 45/00* | (2006.01) |
| *B27B 5/32* | (2006.01) |
| *B23D 47/12* | (2006.01) |

(52) U.S. Cl.
CPC ......... *B23D 47/045* (2013.01); *B23D 45/003* (2013.01); *B23D 45/044* (2013.01); *B23D 45/048* (2013.01); *B27B 5/201* (2013.01); *B27B 5/29* (2013.01); *B27B 5/32* (2013.01); *B23D 47/126* (2013.01); *B27B 5/206* (2013.01)

(58) Field of Classification Search
CPC .. B23D 45/044; B23D 45/042; B23D 59/002; B23D 45/048; B23D 45/046; B23D 47/045; Y10T 83/7697; Y10T 83/7693; Y10T 83/7705; Y10T 83/7722; Y10T 83/7726; Y10T 83/8773; B27B 5/29; B27B 5/32

See application file for complete search history.

(56) References Cited

U.S. PATENT DOCUMENTS

| 6,865,976 | B2 * | 3/2005 | Parks | B23D 45/048 |
| | | | | 83/471.3 |
| 7,127,977 | B2 * | 10/2006 | Carroll | B23D 45/044 |
| | | | | 83/471.3 |
| 7,201,090 | B2 * | 4/2007 | Svetlik | B23D 45/044 |
| | | | | 83/471.3 |
| 9,533,362 | B2 * | 1/2017 | Wu | B23D 47/025 |
| 2008/0210073 | A1 * | 9/2008 | Zhang | B23D 45/044 |
| | | | | 83/471.3 |
| 2011/0314988 | A1 * | 12/2011 | Xu | B27B 5/29 |
| | | | | 83/471.3 |

FOREIGN PATENT DOCUMENTS

CA    2437192 A1 *  5/2004  .......... B23D 45/044

\* cited by examiner

*Primary Examiner* — Jennifer B Swinney

(57) ABSTRACT

A power miter saw includes an activation assembly including a lever, a spring loaded drive rod passing through an underside of the table, a curved link pivotably secured to the drive rod, a pivotal member pivotably secured to the curved link and secured to the lever, a driven rod, a clamping member in an edge of a positioning seat, and an axle through the positioning seat and having an end pivotably disposed in a support seat; a graduated member including apertures; and a locking device including a hollow member having two side slots, a spring loaded cam member, and a transverse bar passing through the positioning seat, the slots, and the cam member; a spring loaded pin secured to a forward end of the hollow member; and two lever members secured to two ends of the transverse bar respectively. A pivotal movement of the lever unfastens a positioning seat.

6 Claims, 17 Drawing Sheets

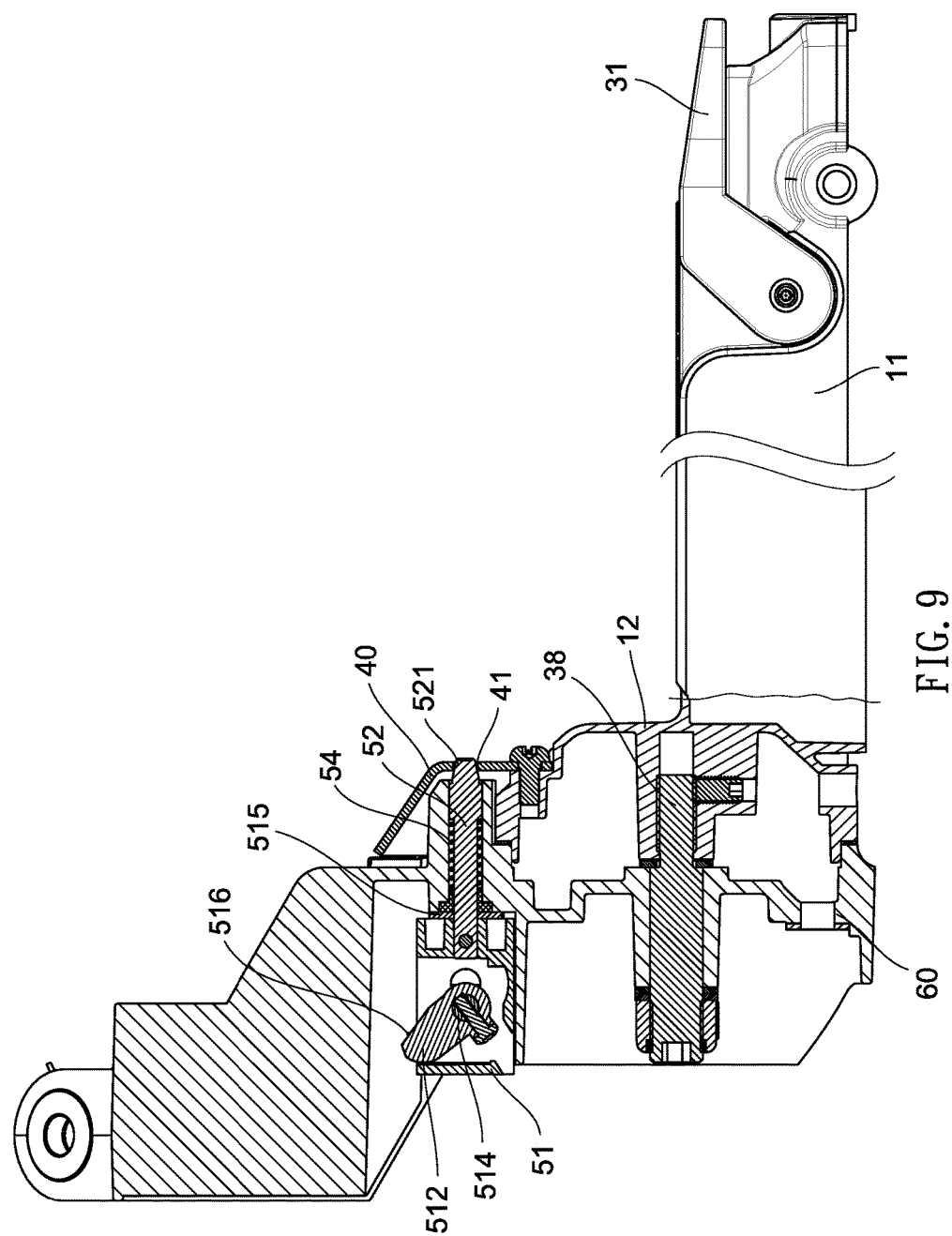

MECHANISM FOR THE RELATIVE POSITIONING OF AN INCLINED MEMBER AND A GRADUATED MEMBER

BACKGROUND OF THE INVENTION

1. Field of the Invention

The invention relates to relative positioning of two members and more particularly to a mechanism for the relative positioning of an inclined member and a graduated member of a power miter saw.

2. Description of Related Art

U.S. Pat. No. 6,892,618 to the present inventor Chang discloses a circular sawing machine comprising a base; a saw seat movable relative to the base; and a link mechanism pivotally mounted between the base and the saw seat. The saw seat is linearly movable relative to the base. The link mechanism has a symmetrical structure so that the saw seat can be moved linearly relative to the base by linear movement of the link mechanism. The link mechanism includes a positioning seat secured on the base, two symmetrically opposite first links each having a first end mounted on the positioning seat, two symmetrically opposite second links each having a first end pivotally mounted on a second end of a respective one of the two first links, and two symmetrically opposite third links each having a first end pivotally mounted on a second end of a respective one of the two second links and a second end pivotally mounted on a connecting seat which is mounted on the saw seat.

While the device enjoys its success in the market, continuing improvements with respect to a mechanism for the relative positioning of an inclined member and a graduated member of the power miter saw are constantly being sought.

SUMMARY OF THE INVENTION

It is therefore one object of the invention to provide a power miter saw comprising a base; a table rotatably mounted on the base; a saw blade and motor mechanism configured to rotate a circular saw blade thereof; a pivotal positioning seat interconnecting two linear guide mechanisms and a support seat at a rear end of the base; a connecting seat interconnecting the linear guide mechanisms to the saw blade and motor mechanism; an activation assembly including a U-shaped lever pivotably disposed at an end of a forward arm of the table, a drive rod disposed under the forward arm and passing through an underside of the table to be adjacent to a rear end of the table, a curved link pivotably secured to the drive rod, a pivotal member pivotably secured to the curved link and secured to the U-shaped lever, a first spring put on a rear portion of the drive rod, a limit member secured to a rear surface of the positioning seat and including a curved slot, a driven rod passing through the curved slot and having one end urged by the rear portion of the drive rod in a locked position, a clamping member secured to the other end of the driven rod and disposed in a position adjacent to an edge of the positioning seat, and an axle disposed through a central part of the positioning seat and having an end pivotably disposed in the support seat; a graduated member secured to the support seat and including a plurality of apertures arranged as a curve; and a locking device including a moveable hollow member disposed in an upper portion of the positioning seat and having two slots on two sides respectively, a cam member disposed in an internal space, a transverse bar passing through the positioning seat, the slots, and the cam member and secured to the cam member, and a second spring for fastening the cam member, the transverse bar, and the hollow member together; a pin having an enlarged head and a rear end secured to a forward end of the hollow member; two lever members secured to two ends of the transverse bar respectively; and a third spring put on the pin and biased between the enlarged head and a fastener engaging a forward end of the hollow member; wherein in a locked state, the U-shaped lever is flush with the table, the driven rod is urged by the drive rod, the graduated member is locked with the enlarged head of the pin disposed in a central one of the apertures, the positioning seat is fastened by the clamping member, and the transverse bar passes through rear ends of the slots.

The above and other objects, features and advantages of the invention will become apparent from the following detailed description taken with the accompanying drawings.

BRIEF DESCRIPTION OF THE DRAWINGS

FIG. 9 is a longitudinal sectional view showing the graduated member being locked by the pin of the locking device;

DETAILED DESCRIPTION OF THE INVENTION

Figure 1:
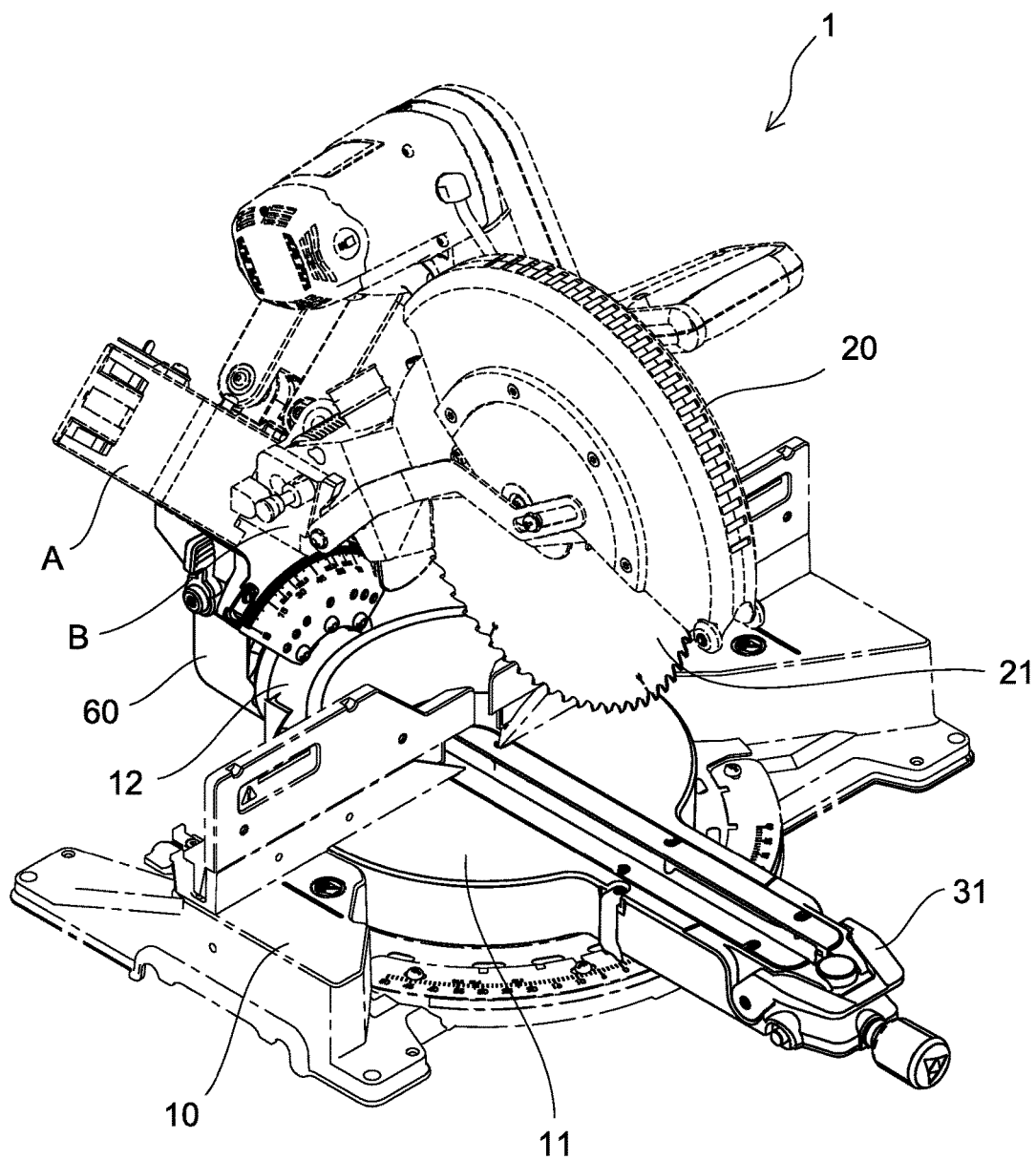
FIG. 1 is a perspective view of a power miter saw incorporating a mechanism for the relative positioning according to the invention.
Figure 2:
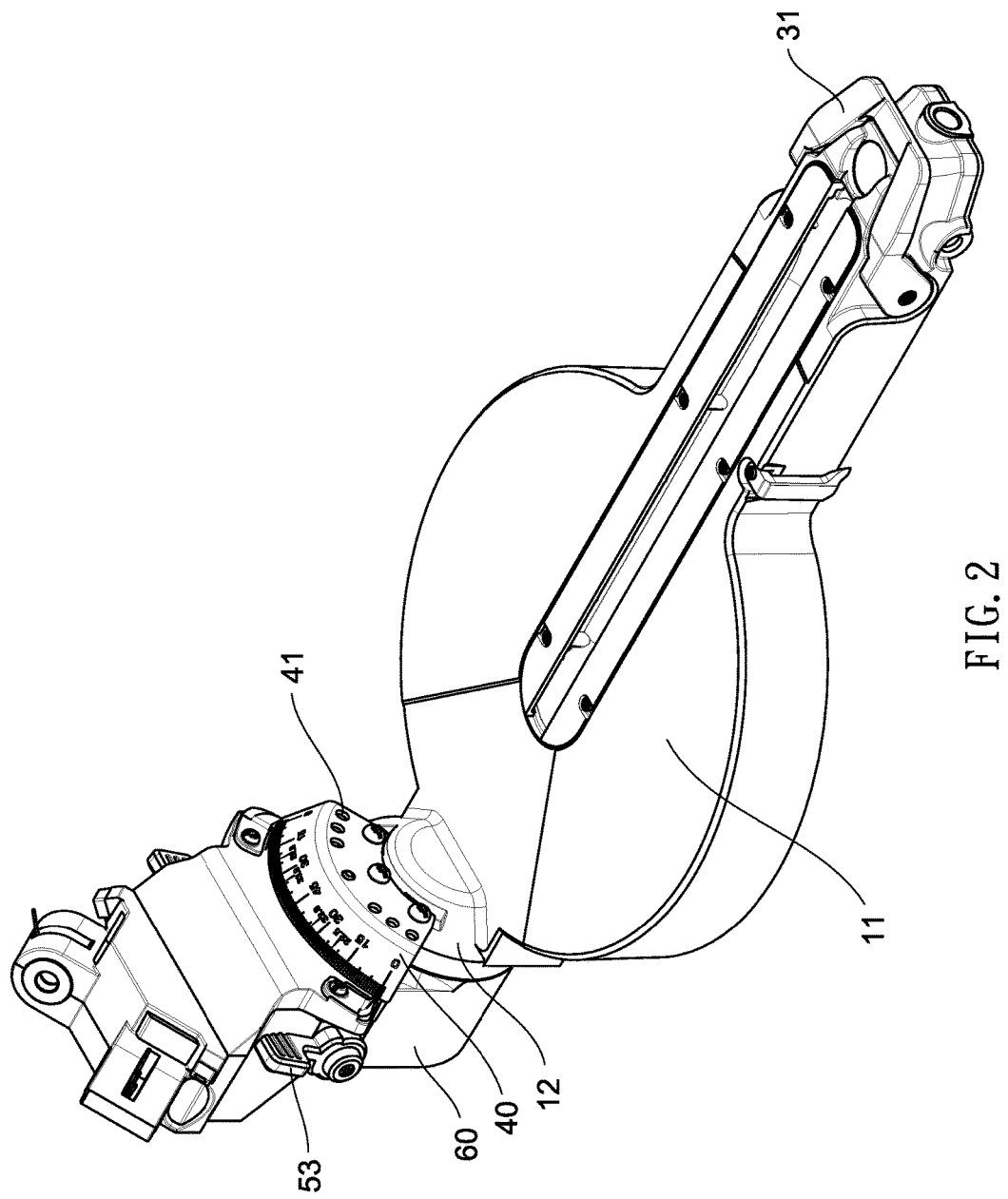
FIG. 2 is a perspective view of the base, the table, the graduated member, the support seat and the positioning seat.
Figure 3:
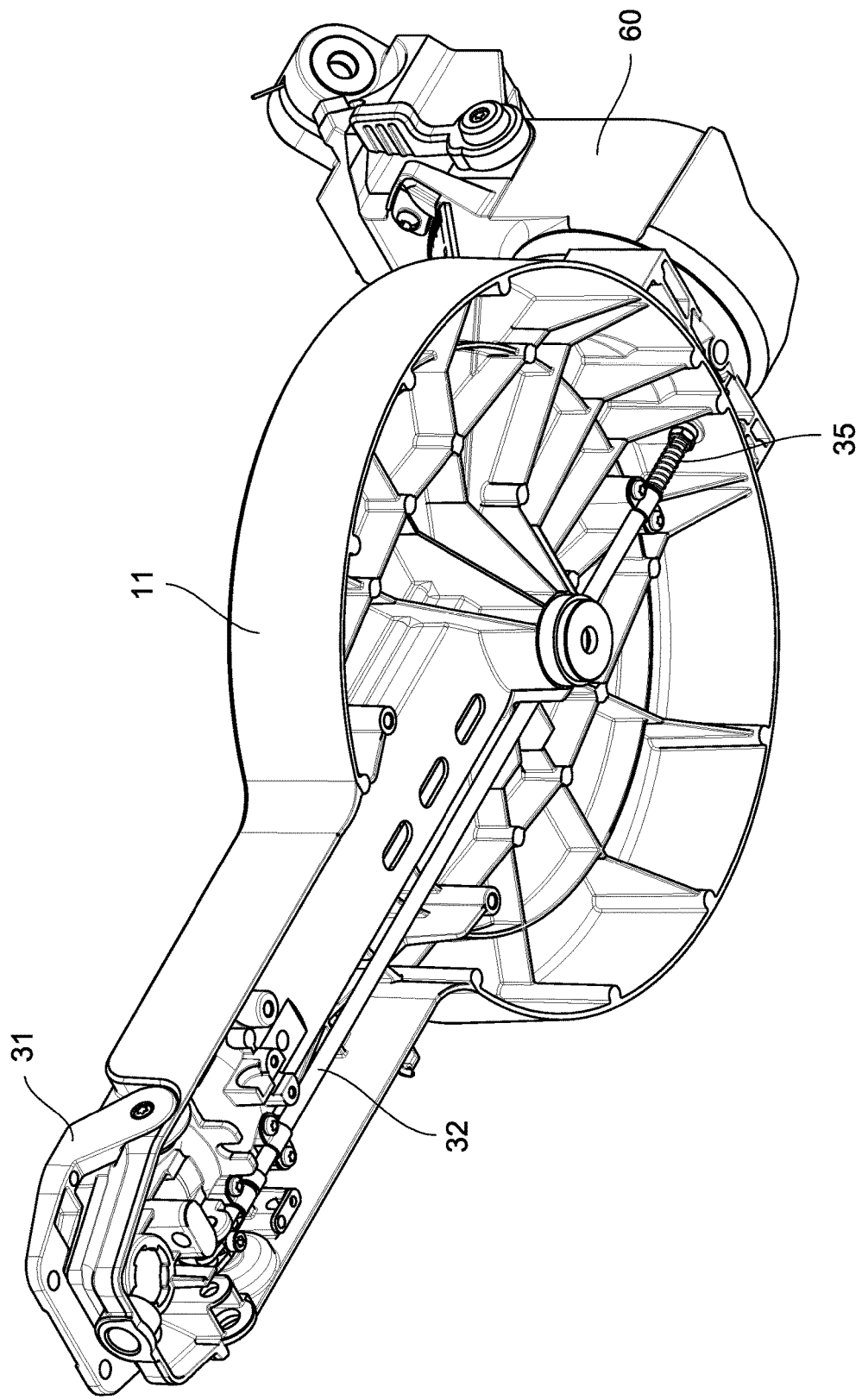
FIG. 3 is another perspective view of the components shown in FIG. 2.
Figure 4:
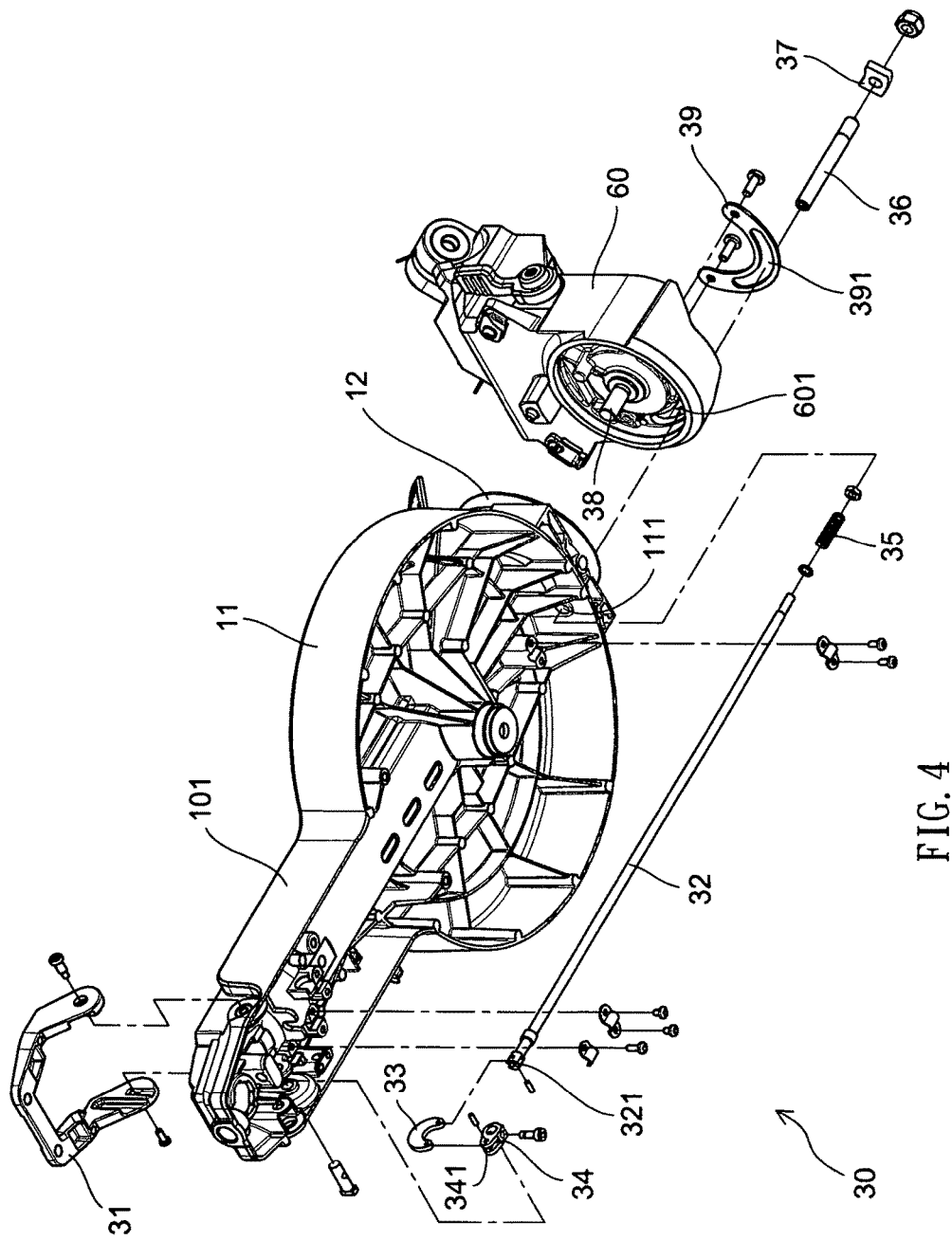
FIG. 4 is an exploded perspective view of FIG. 3.
Figure 5:
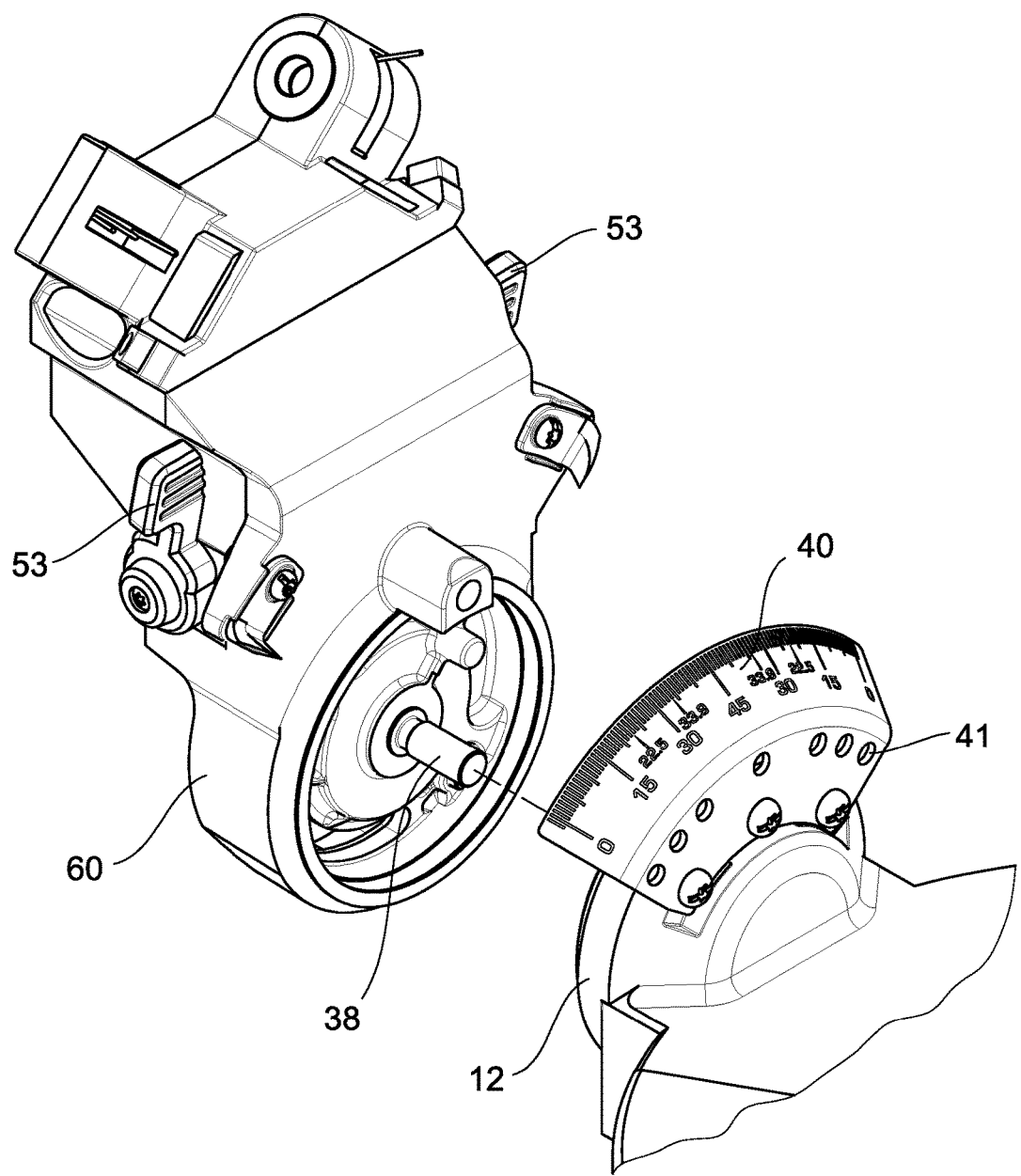
FIG. 5 is a perspective view showing the positioning seat to be secured to the support seat.
Figure 6:
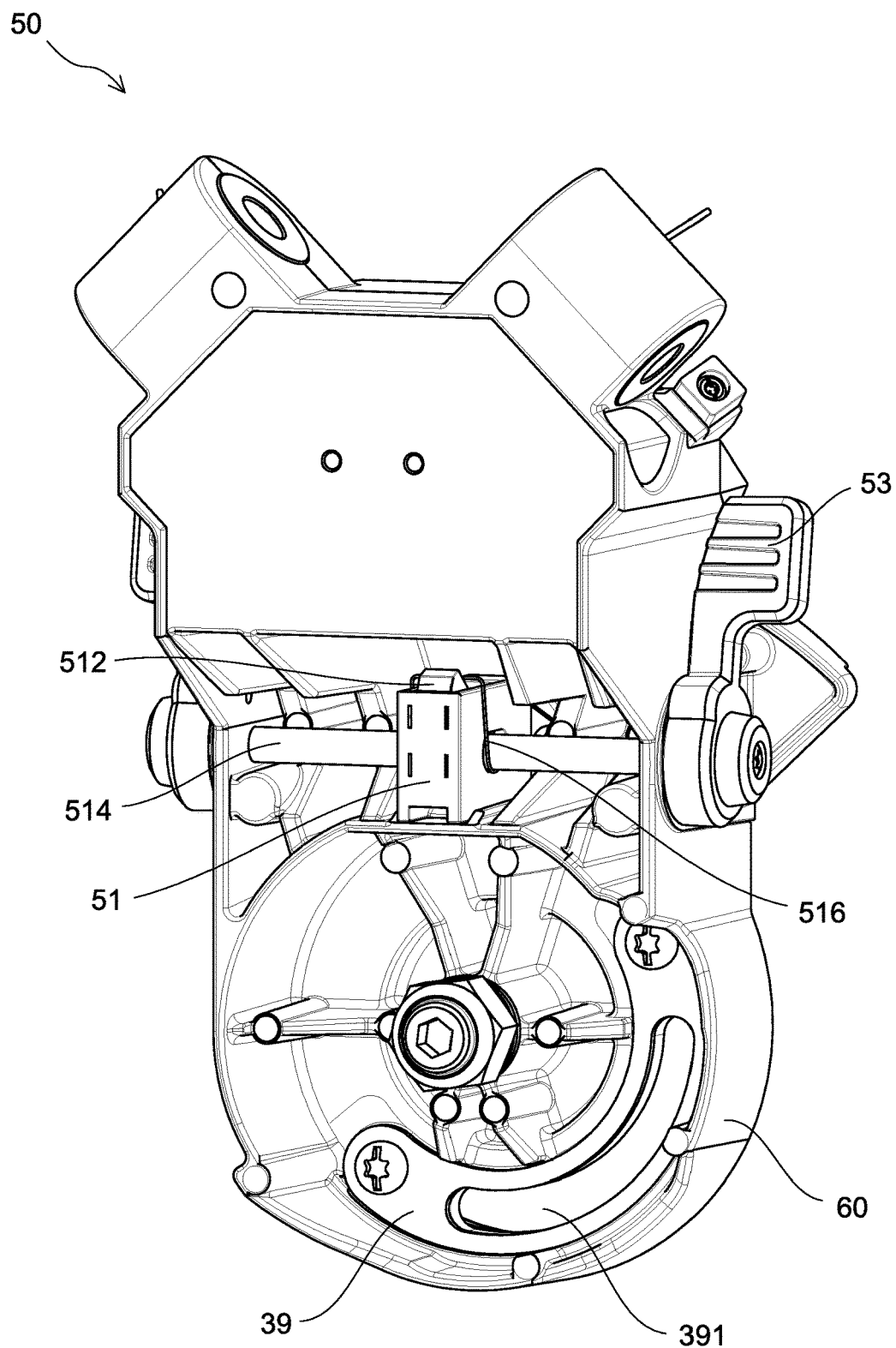
FIG. 6 is a perspective view of the positioning seat in a locked position.
Figure 6A:
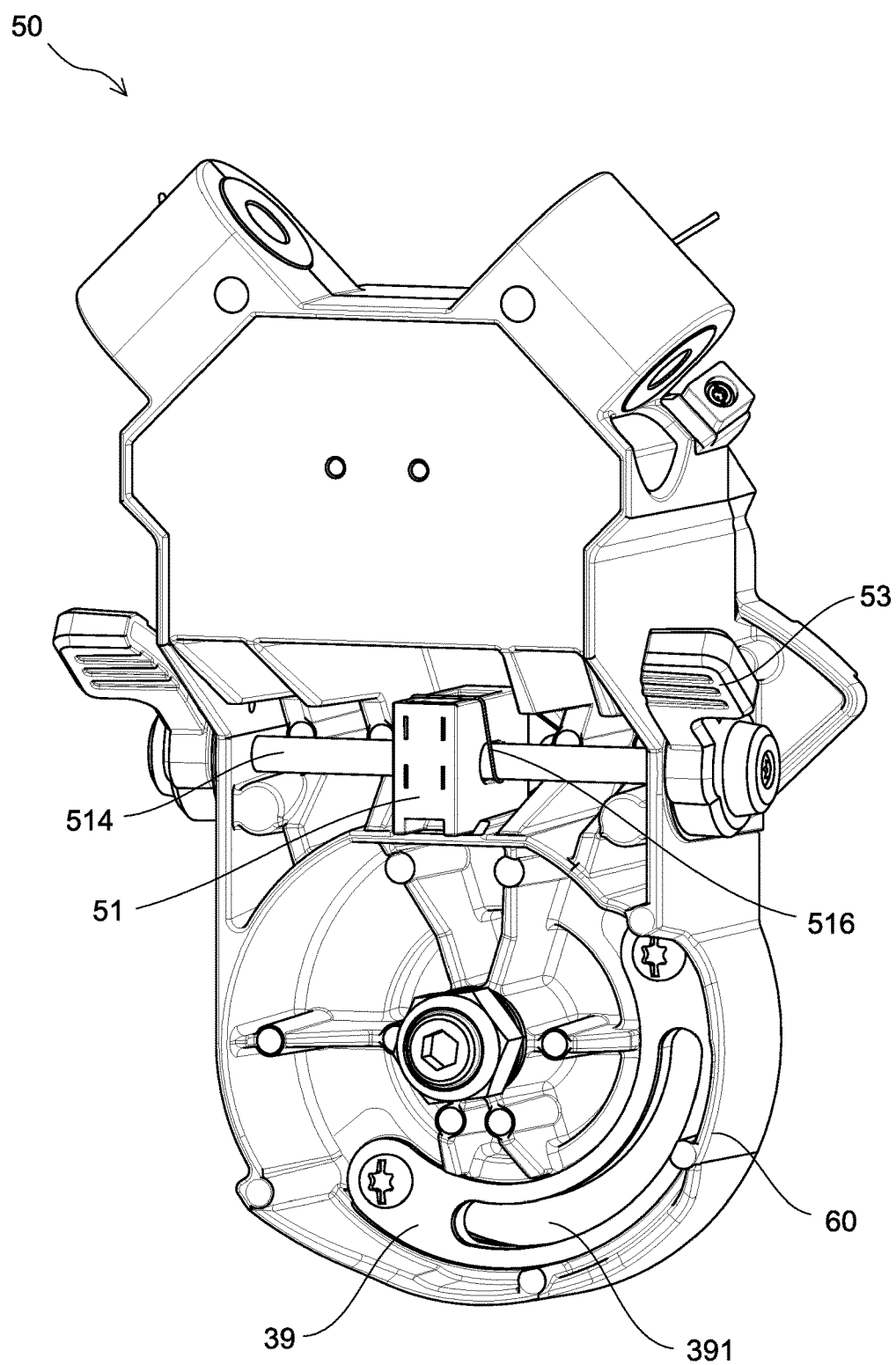
FIG. 6A is a perspective view of the positioning seat in an unlocked position.
Figure 7:
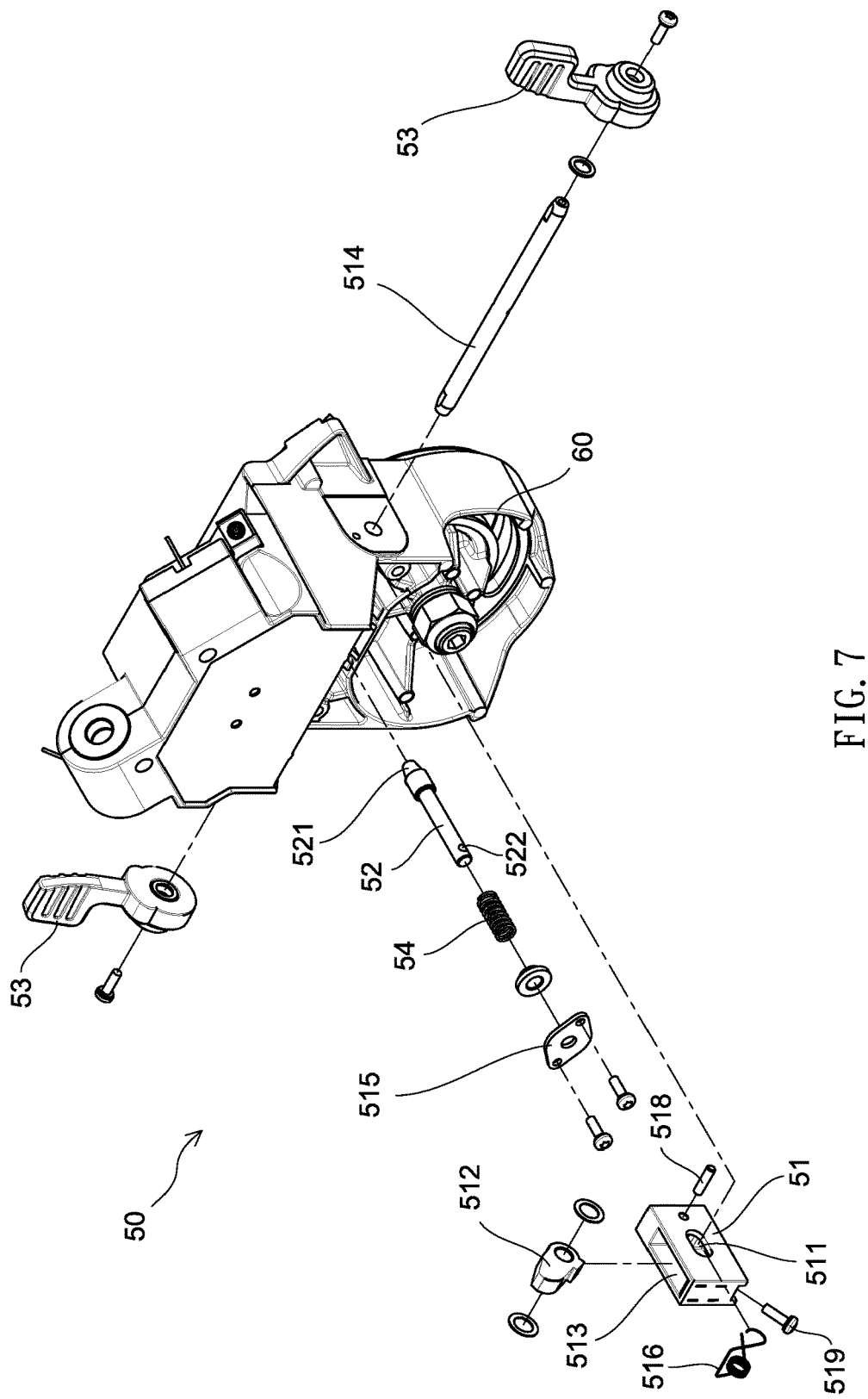
FIG. 7 is an exploded view of the positioning seat and the locking device.
Figure 8:
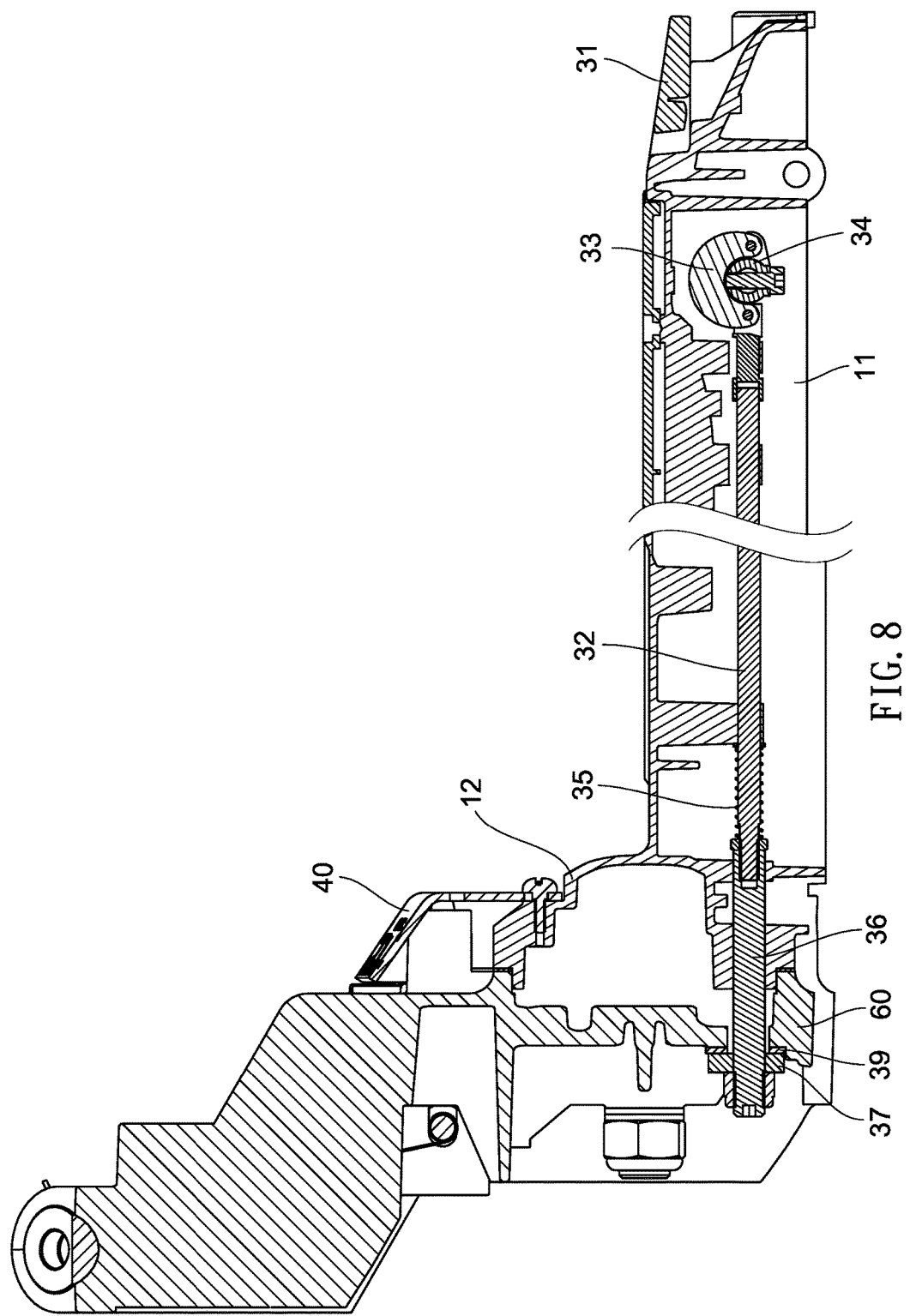
FIG. 8 is a longitudinal sectional view of the components shown in FIG. 2 in a locked position.
Figure 8A:
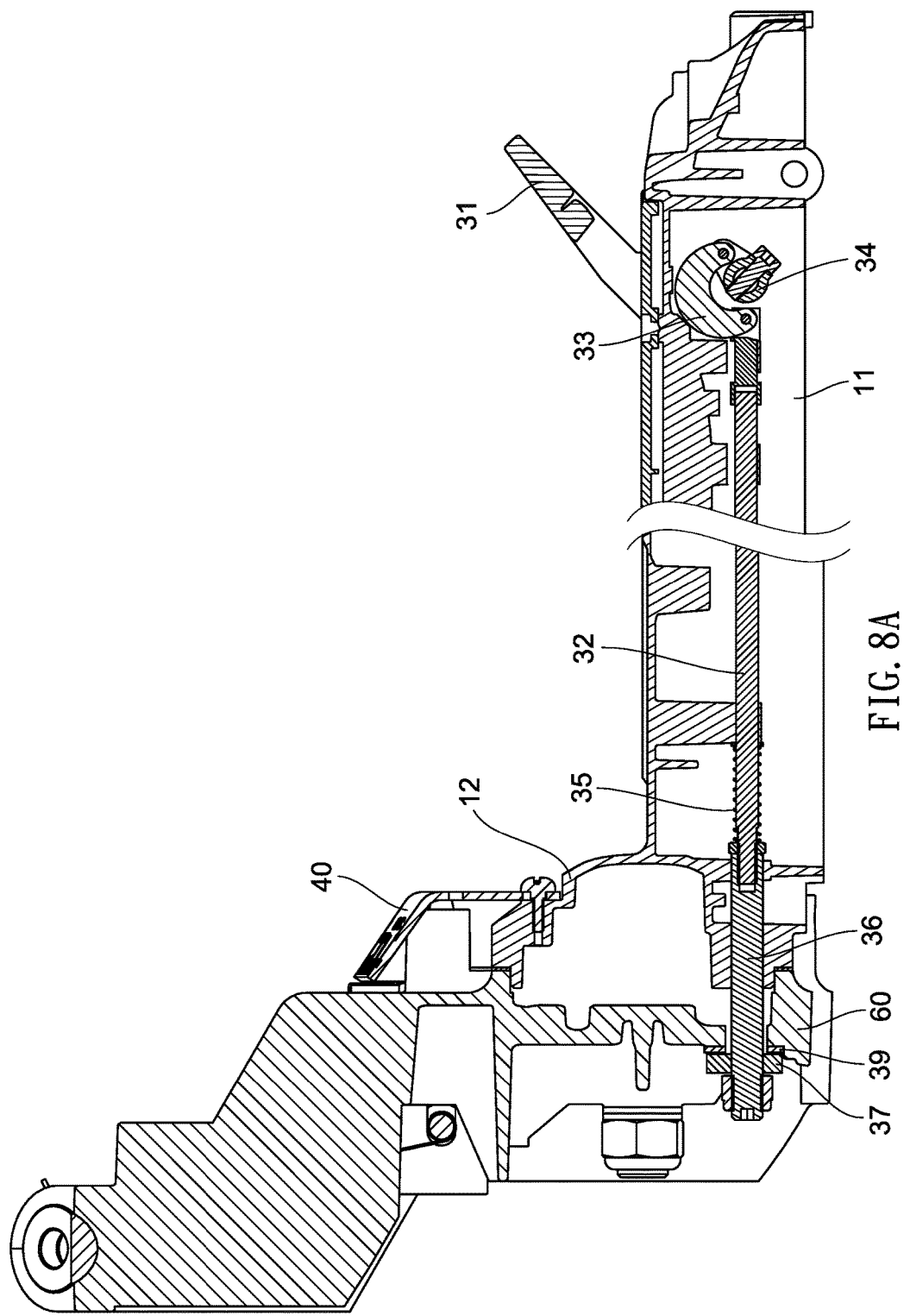
FIG. 8A is a view similar to FIG. 8 with the lever being pivoted upward in an unlocking operation.
Figure 9A:
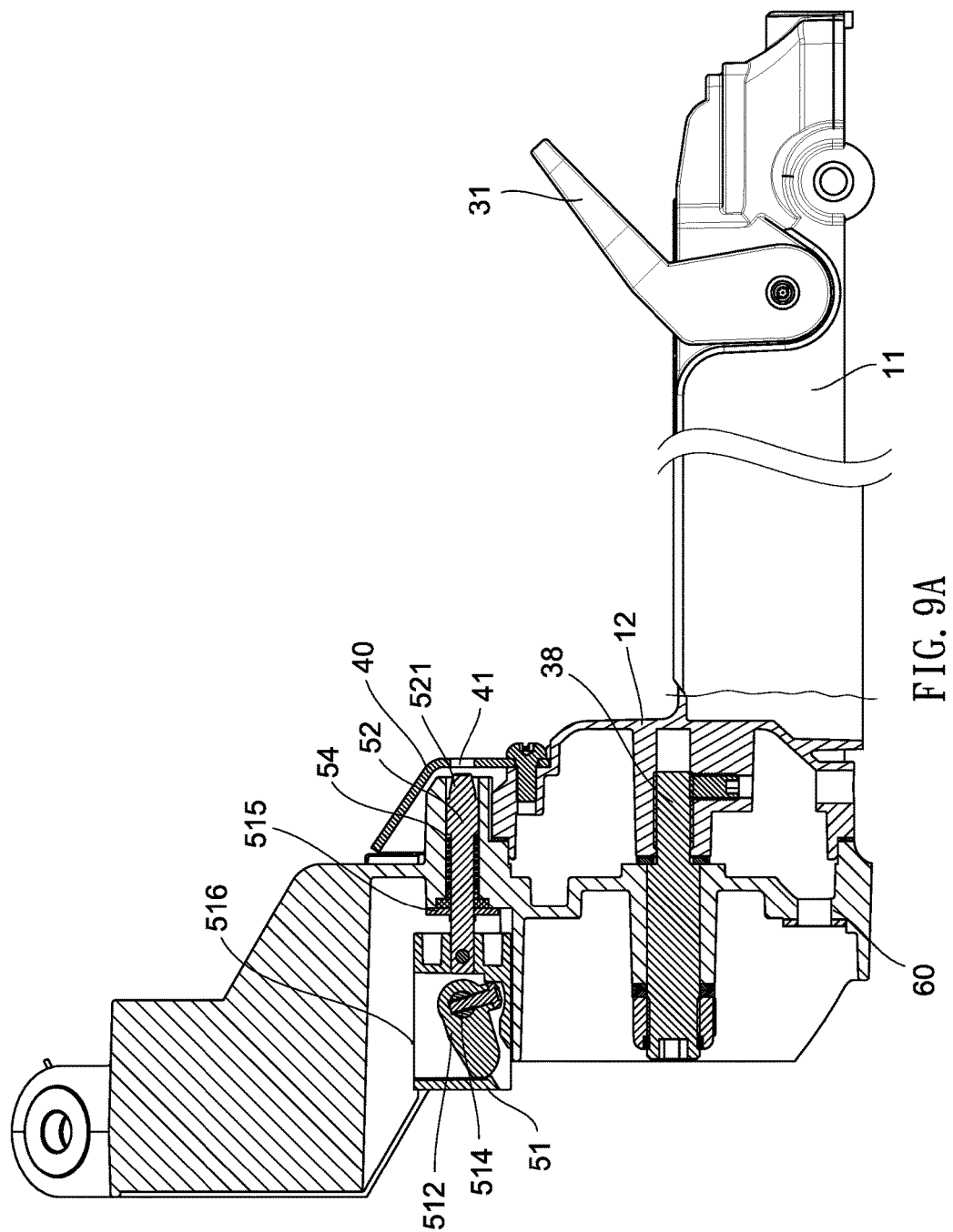
FIG. 9A is a view similar to FIG. 9 showing the graduated member being unlocked by the pin.

Referring to FIGS. 1 to 13, a power miter saw 1 in accordance with the invention comprises the following components as discussed in detail below.

A base 10 and a rotatable table 11 on the base 10 are provided. The table 11 is configured to receive a workpiece (not shown). A saw blade and motor mechanism 20 is configured to rotate a circular saw blade 21. A pivotal positioning seat 60 interconnects two linear guide mechanisms A and a rear support seat 12 of the base 10. An upper connecting seat B interconnects the linear guide mechanisms A to the saw blade and motor mechanism 20.

A mechanism for the relative positioning of an inclined member and a graduated member of the power miter saw as the subject of the invention is discussed in detail below.

An activation assembly 30 includes a U-shaped lever 31 pivotably disposed at an end of a forward arm 101 of the table 11, a drive rod 32 having a bifurcation 321 at one end and the other end passing through a hole 111 on an underside of the table 11 and a curved slot 601 on a lower portion of the positioning seat 60 to dispose at a position near a rear end of the table 11, a curved link 33 having a rear end pivotably secured to the bifurcation 321, a pivotal member 34 including a bifurcation 341 at a front end and pivotably secured to the front end of the curved link 33, the pivotal member 34 being secured to the lever 31 and configured to pivot by pivoting the lever 31, a first spring 35 put on the other end of the drive rod 32, a limit member 39 secured to a rear surface of the positioning seat 60 and including a curved slot 391, a driven rod 36 passing through the curved slot 391 and having one end engaging the other end of the drive rod 32 in a locked position, a clamping member 37 secured to the other end of the driven rod 36 and disposed in a position adjacent to an edge of the positioning seat 60, and an axle 38 disposed through a central part of the positioning seat 60 and has an end pivotably disposed in the support seat 12.

It is envisaged by the invention that the positioning seat 60 is limited to pivot an angle from one end of the curved slot 391 due to contact of one end of the curved slot 391 with the driven rod 36 to the other end thereof also due to contact of the other end of the curved slot 391 with the driven rod 36.

A graduated member 40 is secured to the support seat 12 and includes an odd number of (e.g., 7) apertures 41 arranged as a curve. A locking device 50 includes a moveable hollow member 51 in an upper portion of the positioning seat 60 and having two opposite, elongated slots 511 on two sides respectively, a cam member 512 in an internal space 513, a transverse bar 514 through the positioning seat 60, the slots 511 and the cam member 512 and secured to the cam member 512 by means of a fastener 519, and a second spring 516 for fastening the cam member 512, the transverse bar 514 and the hollow member 51 together; a pin 52 having an enlarged head 521 and a rear end 522 passing through a third spring 54 and an internally threaded fastener 515 secured to a rear surface of the positioning seat 60 so as to further secure the pin 52 to a forward end of the hollow member 51 by means of a fastener 518; and two lever members 53 secured to two ends of the transverse bar 514 respectively. The third spring 54 is put on the pin 52 and biased between the enlarged head 521 and the fastener 515.

Figure 10:
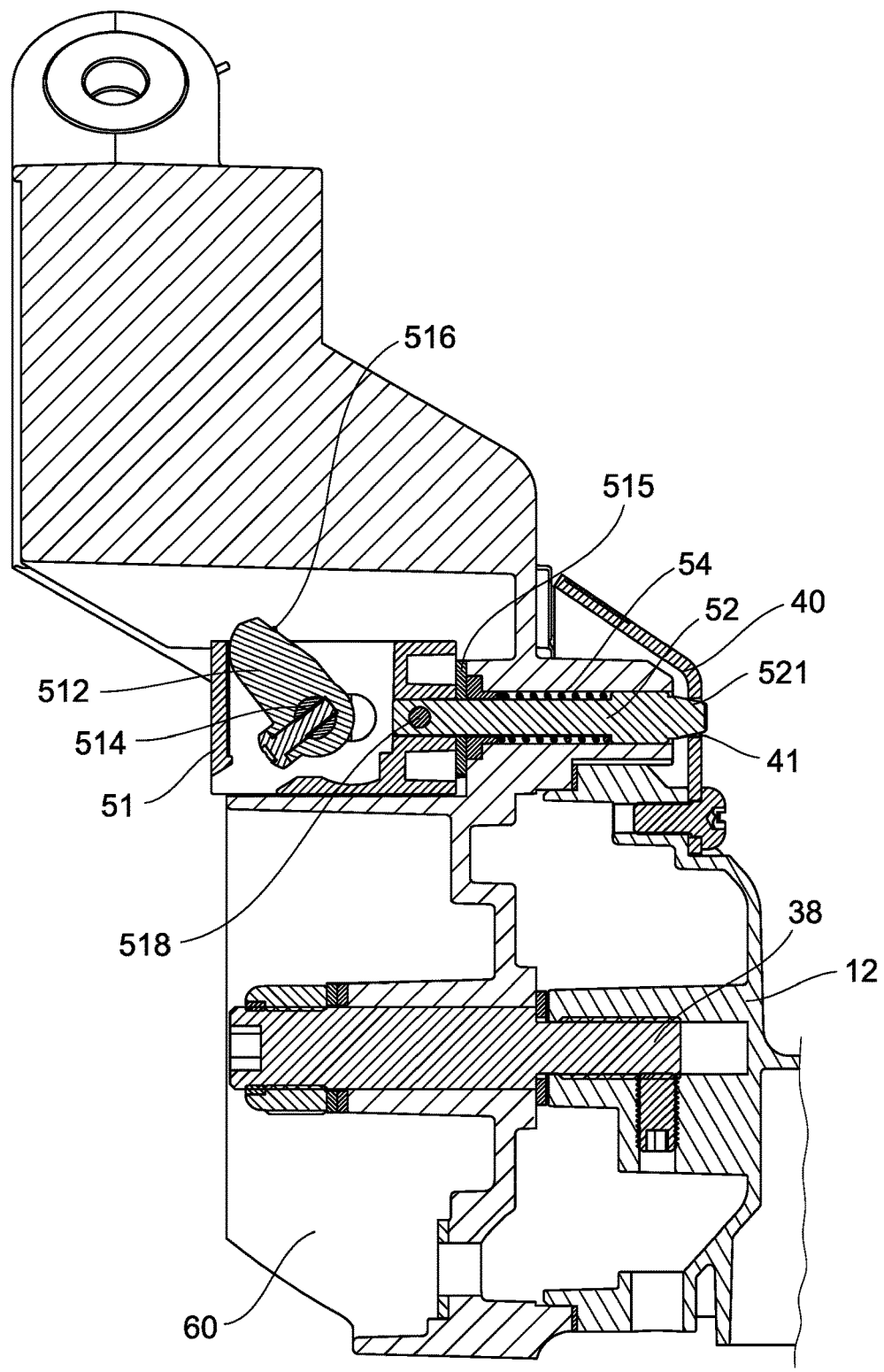
FIG. 10 is an enlarged view of the locking device shown in FIG. 9.
Figure 10A:
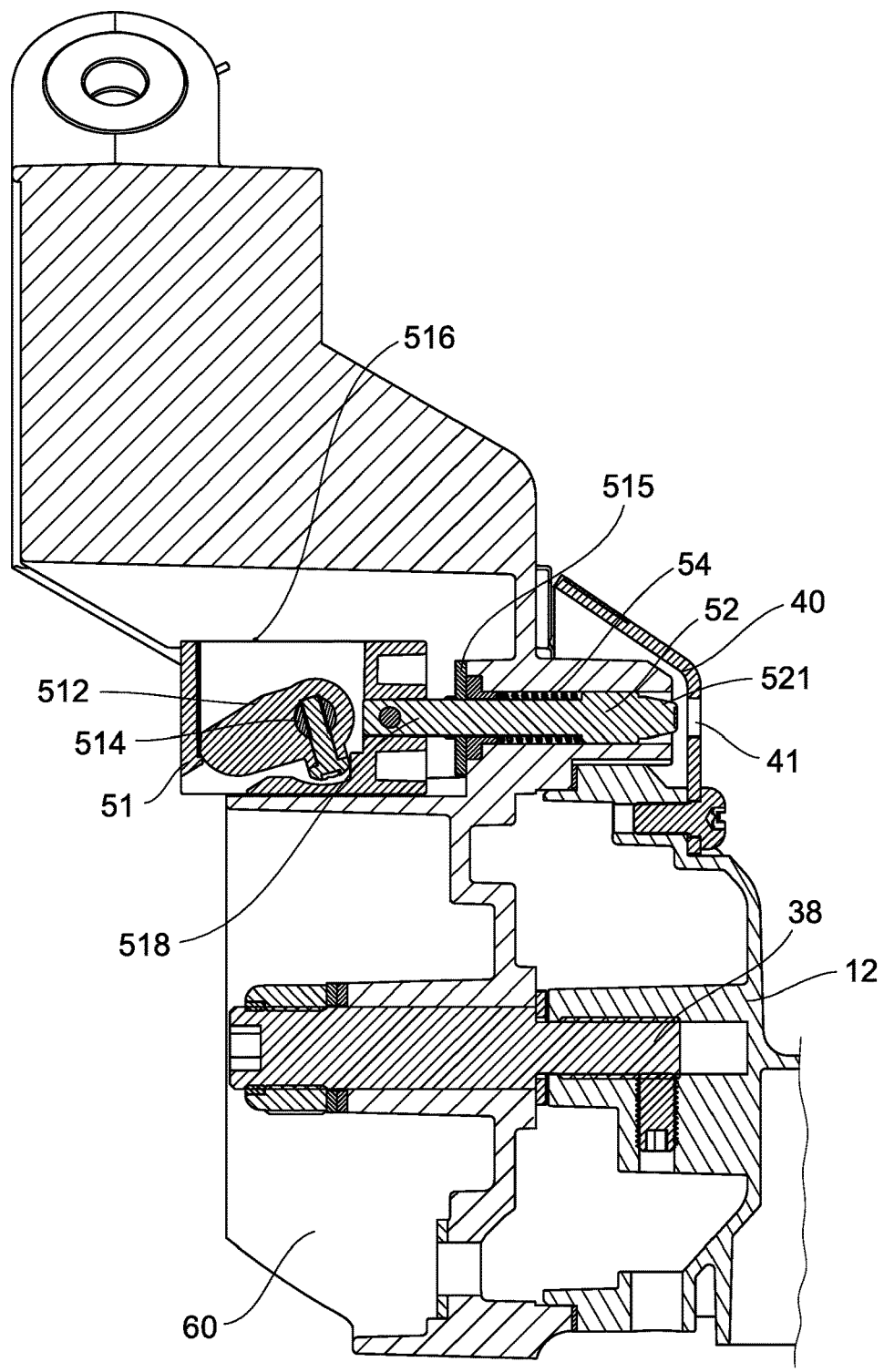
FIG. 10A is an enlarged view of the locking device shown in FIG. 9A.
Figure 11:
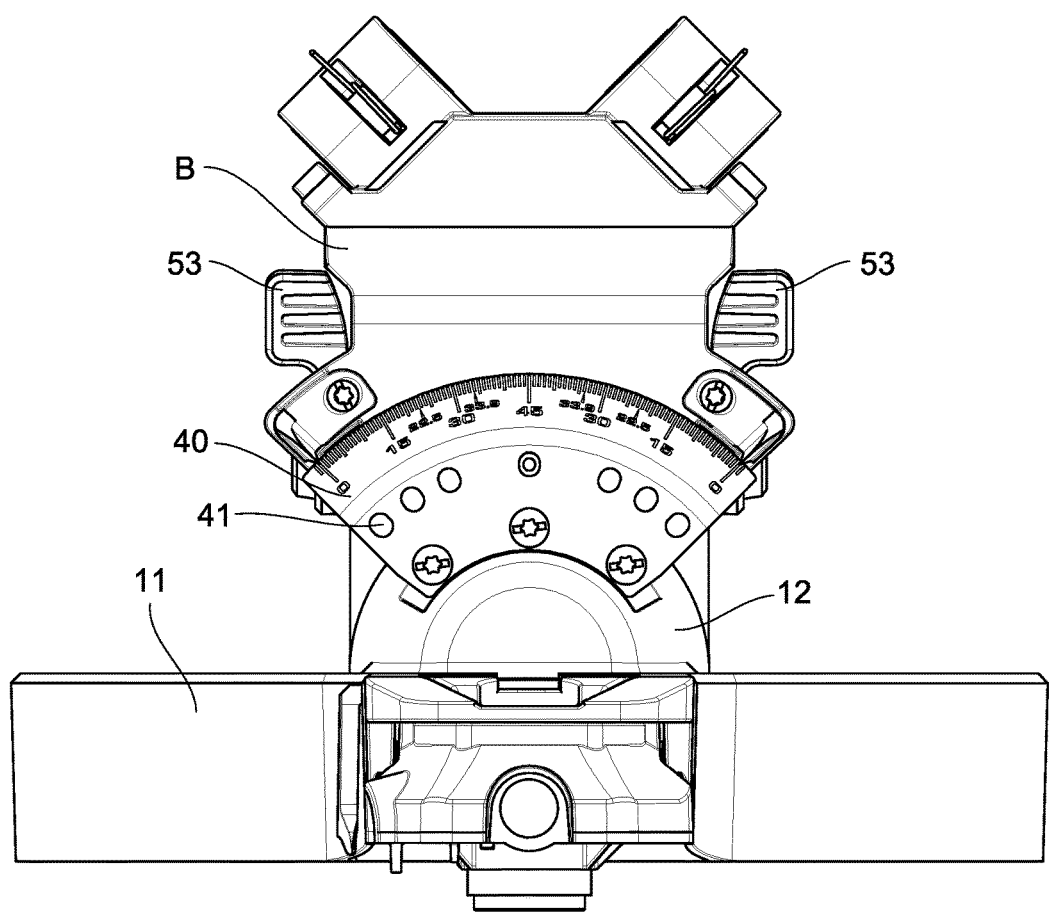
FIG. 11 is a front view of FIG. 2.
Figure 12:
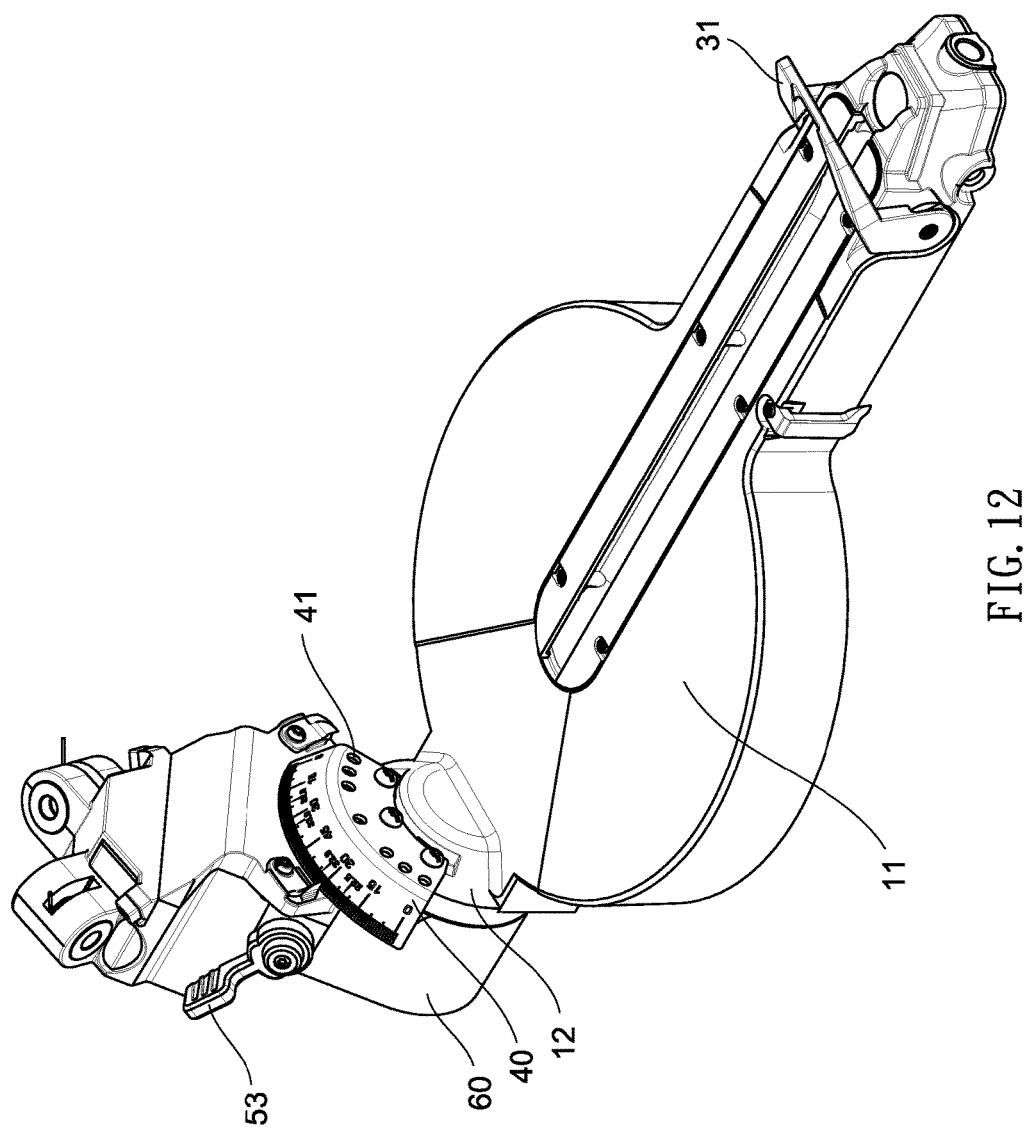
FIG. 12 is another perspective view of the base, the table, the graduated member, the support seat and the positioning seat with the positioning seat being inclined.
Figure 13:
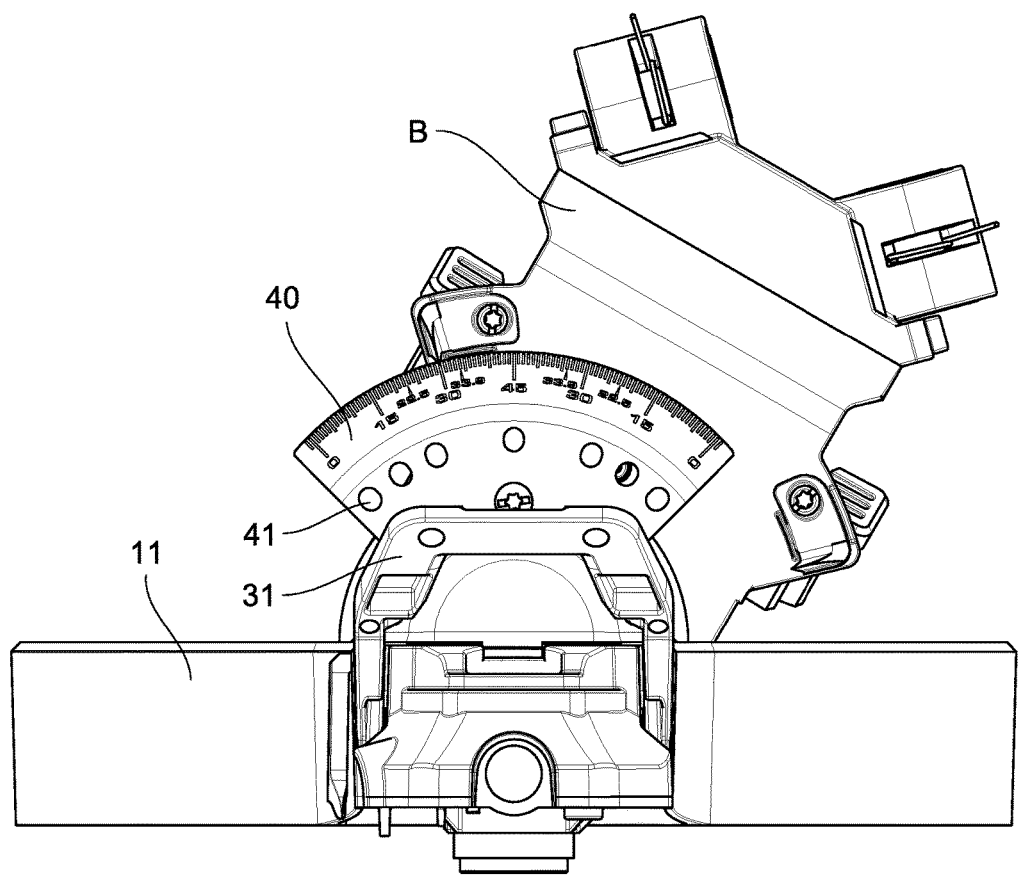
FIG. 13 is a front view of FIG. 12.

The head of the pin 52 is disposed in a central one of the apertures 41 of the graduated member 40 in a default locked position. A rearward pivotal movement of either lever member 53 moves both the cam member 512 and the transverse bar 514 forward along the slots 511 because the cam member 512 urges an inner surface of the the hollow member 51 (see FIG. 10A). And in turn, the pin 52 moves rearward to clear the aperture 41. Thus, the positioning seat 60 is not locked by the graduated member 40 and is configured to pivotally move an inclined angle.

In a default locked state, the lever 31 is flush with the table 11, the driven rod 36 is urged by the drive rod 32, the graduated member 40 is locked by inserting the enlarged head 521 of the pin 52 into the central one of the apertures 41, and the positioning seat 60 is fastened by the clamping member 37.

For adjusting a pivotal angle of the positioning seat 60 in a cutting operation, the lever 31 is pivoted upward to pivot both the pivotal member 34 and the curved link 33, thereby unlocking the drive rod 32. And in turn, the drive rod 32 moves rearward to push the driven rod 36 which in turn unfastens the clamping member 37. Thus, the inner surface of the positioning seat 60 is not clamped by the clamping member 37. As a result, an adjustment of a pivotal angle of the positioning seat 60 is made possible. The pivotal member 34 is configured to co-rotate with the lever 31. Further, the curved link 33 pivots to move both the drive rod 32 and the driven rod 36 rearward. And in turn, the clamping member 37 disengages from the positioning seat 60 due to the expansion of the first spring 35. Thus, the positioning seat 60 is not fastened by the clamping member 37. Therefore, it is possible of adjusting a pivotal angle of the positioning seat 60 prior to cutting. Next, the user may rearward pivot one of the lever members 53 to pivot the cam member 512 with the second spring 516 being compressed. And in turn, the cam member 512 pushes an inner surface of the hollow member 51 to move the hollow member 51 rearward. Next, the user may pivot the linear guide mechanisms A and the positioning seat 60 a predetermined angle (i.e., the linear guide mechanisms A being inclined). Next, the user may release the lever member 53. And in turn, the second spring 516 expands to pivot the lever members 53 to original, locked positions. And in turn, the cam member 512 pushes the inner surface of the hollow member 51 to move the hollow member 51 forward. That is, the user can adjust a pivotal angle of the positioning seat 60 by elastically disengaging the enlarged head 521 of the pin 52 from the aperture 41 of the graduated member 40 by forwardly pivoting the lever members 53.

Then the user may pivot the lever 31 to its original, locked position to cause the drive rod 32 to engage with the driven rod 36. Thus, the positioning seat 60 is fastened by the clamping member 37. As a result, the inclined linear guide mechanisms A are positioned relative to the graduated member 40.

While the invention has been described in terms of preferred embodiments, those skilled in the art will recognize that the invention can be practiced with modifications within the spirit and scope of the appended claims.

What is claimed is:

1. A power miter saw comprising:
    a base;
    a table rotatably mounted on the base;
    a saw blade and motor mechanism configured to rotate a circular saw blade thereof;
    a pivotal positioning seat interconnecting two linear guide mechanisms and a support seat at a rear end of the base, the positioning seat including a curved slot;
    a connecting seat interconnecting the linear guide mechanisms to the saw blade and motor mechanism;
    an activation assembly including a U-shaped lever pivotably disposed at an end of a forward arm of the table, a drive rod disposed under the forward arm and passing through an underside of the table to be adjacent to a rear end of the table, a curved link pivotably secured to the drive rod, a pivotal member pivotably secured to the curved link and secured to the U-shaped lever, a first spring disposed on a rear portion of the drive rod, a limit member secured to a rear surface of the positioning seat and including a curved slot, a driven rod passing through both the curved slot of the positioning seat and the curved slot of the limit member and having one end urged by the first spring on the drive rod in a locked position, a clamping member secured to another end of the driven rod and disposed in a position adjacent to an edge of the positioning seat, and an axle disposed through a central part of the positioning seat and having an end pivotably disposed in the support seat;

a graduated member secured to the support seat and including a plurality of apertures arranged as a curve; and a locking device including a moveable hollow member disposed in an upper portion of the positioning seat and having two slots on two sides respectively, a cam member disposed in an internal space, a transverse bar passing through the positioning seat, the slots, and the cam member and secured to the cam member, and a second spring for fastening the cam member, the transverse bar, and the hollow member together; a pin having an enlarged head and a rear end secured to a forward end of the hollow member; two lever members secured to two ends of the transverse bar respectively; and a third spring disposed on the pin and biased between the enlarged head and a fastener secured to a forward end of the hollow member;

wherein in a locked state, the U-shaped lever is flush with the table, the driven rod is urged by the first spring of the drive rod, the graduated member is locked with the enlarged head of the pin disposed in a central one of the apertures, the positioning seat is fastened by the clamping member, and the transverse bar passes through rear ends of the slots.

2. The power miter saw of claim 1, wherein the U-shaped lever is configured to pivot a predetermined angle, the pivotal member rotates the predetermined angle to pivot the curved link, the curved link pulls to disengage the drive rod from the driven rod, the clamping member moves forward to disengage from the positioning seat due to the expansion of the first spring, a rearward pivoting of one of the lever members pivots the cam member with the second spring being compressed, the cam member pushes an inner surface of the hollow member to move the hollow member rearward and move the transverse bar from the rear ends of the slots to front ends thereof, and the hollow member disengages from the fastener and the enlarged head of the pin disengages from the central aperture with the third spring being compressed.

3. The power miter saw of claim 2, wherein a release of the lever member leads to the second spring expanding to pivot the lever members to the locked state, the cam member pushes the inner surface of the hollow member to move the hollow member forward and move the transverse bar from the front ends of the slots to the rear ends thereof, the hollow member engages with the fastener and the enlarged head of the pin enters another aperture with the third spring being expanded, the U-shaped lever is configured to pivot to the locked state with a bifurcation of the drive rod rotating to engage the drive rod with the driven rod, the clamping member moves rearward to clamp the positioning seat due to the compression of the first spring, and the positioning seat is fastened by the clamping member.

4. The power miter saw of claim 1, wherein the driven rod pivots at an angle formed between one end of the curved slot and another end thereof.

5. The power miter saw of claim 4, wherein a number of the apertures is an odd number.

6. The power miter saw of claim 1, wherein the slots are elongated.

* * * * *